(12) United States Patent
Roth et al.

(10) Patent No.: US 10,948,216 B2
(45) Date of Patent: Mar. 16, 2021

(54) VENTILATION DEVICE

(71) Applicant: GRAMMER Interior Components GmbH, Hardheim (DE)

(72) Inventors: Thomas Roth, Neunkirchen arn Sand (DE); Pierre Stehle, Rosbach (DE); Gunter Link, Hainstadt (DE)

(73) Assignee: GRAMMER Interior Components GmbH, Hardheim (DE)

( * ) Notice: Subject to any disclaimer, the term of this patent is extended or adjusted under 35 U.S.C. 154(b) by 20 days.

(21) Appl. No.: 15/423,796

(22) Filed: Feb. 3, 2017

(65) Prior Publication Data

US 2017/0176046 A1 Jun. 22, 2017

Related U.S. Application Data

(63) Continuation of application No. PCT/EP2015/066421, filed on Jul. 17, 2015.

(30) Foreign Application Priority Data

Aug. 7, 2014 (DE) .......................... 202014103672.5

(51) Int. Cl.
   *F24F 13/15*  (2006.01)
   *B60H 1/34*   (2006.01)
   *F24F 13/14*  (2006.01)

(52) U.S. Cl.
   CPC ........... *F24F 13/15* (2013.01); *B60H 1/3421* (2013.01); *F24F 13/142* (2013.01)

(58) Field of Classification Search
   CPC ........ F24F 13/15; F24F 13/142; B60H 1/3421

USPC ......................................................... 454/320
See application file for complete search history.

(56) References Cited

U.S. PATENT DOCUMENTS

| 2,892,395 | A | * | 6/1959 | Goettl | F24F 13/075 454/314 |
| 2,959,117 | A | * | 11/1960 | Wright | F24F 13/075 454/314 |
| 3,120,797 | A | * | 2/1964 | Beyer | B60H 1/28 180/69.2 |
| 5,186,387 | A | * | 2/1993 | Doi | B60H 1/00871 236/49.3 |
| 5,356,336 | A | * | 10/1994 | Stouffer | B60H 1/34 454/155 |
| 5,558,949 | A | * | 9/1996 | Iwatsuki | H01M 2/1083 180/68.5 |

(Continued)

FOREIGN PATENT DOCUMENTS

| CN | 2655098 Y | 11/2004 |
| CN | 103124647 A | 5/2013 |

(Continued)

*Primary Examiner* — Steven B McAllister
*Assistant Examiner* — Charles R Brawner
(74) *Attorney, Agent, or Firm* — Von Rohrscheidt Patents

(57) ABSTRACT

A ventilation device including a housing including at least one horizontal louver and at least one vertical louver in an arrangement nested into each other in a cross over pattern; and a regulation device which controls at least one flow out direction, wherein the at least one horizontal louver and the at least one vertical louver are respectively supported in the housing so that the at least one vertical louver is pivotable about a vertical pivot axis and the at least one horizontal louver is pivotable about a horizontal pivot axis.

8 Claims, 5 Drawing Sheets

(56) References Cited

U.S. PATENT DOCUMENTS

| | | | | |
|---|---|---|---|---|
| 5,639,571 A * | 6/1997 | Waters | H01M 2/1083 | 429/71 |
| 6,012,297 A * | 1/2000 | Ichishi | B60H 1/00871 | 165/203 |
| 6,159,092 A * | 12/2000 | Elder | B60H 1/3421 | 454/152 |
| 7,014,672 B2 * | 3/2006 | Ishihara | B01D 50/00 | 454/184 |
| 8,439,436 B2 * | 5/2013 | Kato | B60N 2/366 | 297/180.1 |
| 8,939,524 B2 * | 1/2015 | Gasser | F24F 1/027 | 312/236 |
| 9,590,228 B1 * | 3/2017 | Wang | H01M 2/362 | |
| 9,591,957 B2 * | 3/2017 | Dyson | A47L 9/009 | |
| 2004/0038643 A1 * | 2/2004 | Katagiri | B60H 1/3421 | 454/314 |
| 2004/0127152 A1 * | 7/2004 | Malott | B60H 1/00364 | 454/136 |
| 2004/0127153 A1 * | 7/2004 | Demerath | B60H 1/3421 | 454/155 |
| 2004/0142653 A1 * | 7/2004 | Gehring | B60H 1/3421 | 454/155 |
| 2004/0259493 A1 * | 12/2004 | Valley | B60H 1/248 | 454/164 |
| 2005/0048905 A1 * | 3/2005 | Yang | B60H 1/3421 | 454/155 |
| 2005/0239391 A1 * | 10/2005 | Shibata | B60H 1/3421 | 454/155 |
| 2006/0116062 A1 * | 6/2006 | Smith | B60H 1/00278 | 454/69 |
| 2009/0242296 A1 * | 10/2009 | Goldsberry | B60K 13/02 | 180/68.3 |
| 2011/0070817 A1 * | 3/2011 | Walters | B60K 11/085 | 454/155 |
| 2012/0270490 A1 * | 10/2012 | Turner | B60K 11/085 | 454/75 |
| 2013/0012115 A1 * | 1/2013 | Schwarz | B60K 11/085 | 454/155 |
| 2013/0109294 A1 * | 5/2013 | Tolinski | F24F 13/20 | 454/367 |
| 2013/0252531 A1 * | 9/2013 | Asano | B60K 11/085 | 454/155 |
| 2014/0113536 A1 * | 4/2014 | Goenka | B60H 1/00028 | 454/152 |
| 2014/0194052 A1 * | 7/2014 | Asano | B60K 11/08 | 454/335 |
| 2014/0199930 A1 * | 7/2014 | Toda | B60K 11/08 | 454/75 |
| 2014/0273806 A1 * | 9/2014 | Frayer, III | B60K 11/085 | 454/335 |
| 2014/0370795 A1 * | 12/2014 | Klop | B60H 1/242 | 454/75 |
| 2015/0050875 A1 * | 2/2015 | Knauer | B60K 11/085 | 454/152 |
| 2015/0118949 A1 * | 4/2015 | Nam | B60K 13/02 | 454/155 |
| 2015/0353052 A1 * | 12/2015 | Salinas | B60S 1/023 | 454/127 |
| 2016/0121852 A1 * | 5/2016 | Yoshimura | B60H 1/00564 | 454/127 |
| 2016/0200174 A1 * | 7/2016 | Tremer | B60H 1/362 | 454/111 |

FOREIGN PATENT DOCUMENTS

| | | |
|---|---|---|
| DE | 2012000 A | 2/1971 |
| DE | 10226441 B3 | 12/1997 |
| DE | 19701499 C1 | 12/1997 |
| DE | 69609459 T2 | 12/2000 |
| DE | 10057421 | 5/2002 |
| DE | 102005027746 | 12/2006 |
| DE | 2007035507 A1 | 1/2009 |
| DE | 202010000445 U1 | 8/2010 |
| GB | 885918 | 1/1962 |
| GB | 2196421 | 4/1988 |

* cited by examiner

VENTILATION DEVICE

RELATED APPLICATIONS

This application is a continuation of International application PCT/EP2015/066421 filed Jul. 17, 2015 claiming priority from German Utility Model Application DE 20 2014 103 672.6 filed on Aug. 7, 2014 both of which are incorporated in their entirety by this reference.

FIELD OF THE INVENTION

The invention relates to a ventilation device for controlling a flow out direction of an air flow.

BACKGROUND OF THE INVENTION

DE 20 12 000 A1 discloses a ventilation device which is provided in particular for an instrument panel component of a motor vehicle for ventilating an interior. The ventilation device includes an outer housing where a control flap for volume adjustment is provided. At an outlet end of the outer housing an inner housing is provided for controlling a flow direction of the outflowing air flow wherein the inner housing receives plural horizontal louvers that are arranged at a distance from each other and fixated in the interior housing. The interior housing is pivotably supported about a horizontal pivot axis in the exterior housing. The interior housing receives plural vertical louvers that are arranged at a distance from each other and which are oriented perpendicular to the fixated horizontal louvers. The vertical louvers have slots so that the horizontal louvers are insertable into the slots and the horizontal and the vertical louvers are arranged in a common plane in the flow out direction. The vertical louvers are controllable to pivot about a vertical pivot axis.

This arrangement has the disadvantage that the interior housing has to be controlled to pivot in order to adjust the flow direction to deviate from horizontal, wherein the interior housing protrudes for example on top in sections relative to a face aperture of the ventilation device and is recessed at a bottom side relative to the face aperture which degrades an optical appearance. Furthermore it is not possible to control the horizontal louvers independently from the vertical louvers.

DE 20 2010 000 445 U1 discloses a ventilation device with a multi-functional actuation button which is configured to adjust the horizontal louver, the vertical louver and the closing flap. Thus, the horizontal louvers are configured by a housing which is pivotable up and down and the vertical louvers are separately arranged behind the housing in an interior of the ventilation device.

Furthermore a ventilation device it is known from DE 102 26 441 B3 and DE 100 57 421 A1 in which the horizontal and vertical louvers are controllable by a single operating element wherein the vertical louvers are arranged in an interior of the housing and the horizontal louvers are arranged separately from the vertical louvers oriented towards the visible side of the ventilation device. The ventilation devices facilitate independent control of the vertical louvers and the horizontal louvers due to the separated serial arrangement, however this does not provide a homogeneous visual appearance of the flow out field of the ventilation device on the visible side.

BRIEF SUMMARY OF THE INVENTION

Thus, it is an object of the invention to propose a ventilation device which facilitates a flexible adjustment of a flow out direction of the air flow and a homogeneous attractive visual appearance of the flow out field.

The object is achieved by a ventilation device in which the horizontal louvers and the vertical louvers are arranged in a cross over pattern and nested into each other, wherein the horizontal louvers and the vertical louvers are respectively supported in the housing so that they are pivotable about their respective pivot axes. This facilitates that each horizontal louver and each vertical louver is pivotably supported in the housing and a homogeneous visual appearance of the flow out field is provided by cross wise nesting of the horizontal louvers and the vertical louvers into each other and the homogeneous visual appearance is also maintained when adjusting different flow out directions.

An advantageous embodiment of the invention provides that the vertical louvers and the horizontal louvers are arranged with clearance from each other in the inter section points so that they are easily adjustable with a desired orientation. Alternatively the intersection points can also form a bearing through which the vertical louver is pivotable about the vertical pivot axis and the horizontal louver is pivotable about the horizontal pivot axis. These can also be configured flexible for example to compensate for tolerances. This has the advantage that the cross over arrangement and the nesting of the horizontal and vertical louvers is supported by the bearing in the intersection points so that a stable and constant grid structure is maintained. Simultaneously the mutual deflection of horizontal and vertical louvers can be secured.

Advantageously the intersection point is formed by a groove shaped indentation in the horizontal or vertical louver in which a bearing pinion of the horizontal or vertical louver is received. This embodiment has the advantage that the intersection point in particular when it forms the bearing is almost unperceivable from the visible side of the ventilation device and optically moves into the background which helps to improve a homogeneous appearance of the flow out field. Advantageously the bearing can be formed without additional bearing elements.

Another advantageous embodiment of the ventilation device provides that the horizontal or vertical louver includes a V-shaped recess which extends opposite to the flow out direction from the intersection point of the horizontal louver and the vertical louver. This V-shaped recess facilitates respective pivotability starting from the intersection point of the vertical louver and the horizontal louver so that the horizontal louver is pivotable about the horizontal pivot axis and the vertical louver is pivotable about the vertical pivot axis to control the flow out direction.

Advantageously the horizontal louver or the vertical louver includes triangular or pennant shaped guide surfaces oriented along the pivot axis of the louvers and against their flow out direction. These triangular or pennant shaped guide surfaces result from the V-shaped recesses and facilitate that the V-shaped recess defines the pivot portion of the horizontal louver. Alternatively the guide surfaces can also have an expanding surface area adjoining the triangular or pennant shaped guide surface wherein the expanding guide surface extends against the flow out direction. Put differently the vertical louver can include a reduction of the width of the guide surface in portions in order to form a pivot portion for the horizontal louver.

The horizontal louver and/or the vertical louver include triangular guide surfaces that are lined up adjoining each other along the pivot axis wherein the guide surfaces are connected with each other by the axle sections. Advantageously the horizontal or vertical louver is made as a one piece injection molded plastic component so that the guide surfaces as well as the bearing pinions can be integrated with each other.

The horizontal louver or the vertical louver advantageously includes a continuous guide surface that is arranged along the longitudinal axis and adjacent to the intersection points wherein the continuous guide surface extends against the outflow direction. Advantageously the longer louver of the two louvers is configured with the continuous guide surface.

The pivot axis of the horizontal louver and the pivot axis of the vertical louver advantageously intersect in the intersection points. Thus, placing the horizontal and the vertical louver on top of each other is simplified structurally.

It is furthermore advantageously provided that the pivot axes of the horizontal and vertical louvers are arranged in a common plane. This arrangement facilitates a flat housing, this means starting from a cover plate or aperture at the visible side of the ventilation device only a small installation space is required which protrudes into the ventilation duct of the ventilation arrangement.

The horizontal louvers are advantageously jointly controllable by a link arrangement. This has the advantage that one coupling location suffices for force introduction to control all horizontal louvers jointly.

The vertical louvers are controllable for example by a common push rod so that a movement of the push rod in the horizontal direction suffices in order to control a lateral flow out direction.

In order to control the horizontal louver and the vertical louver a control device is provided according to a first embodiment wherein the control device respectively includes an actuation element for the horizontal louvers and for the vertical louvers.

It can be alternatively provided that the control device includes a single actuation element which controls the link arrangement for controlling the horizontal louvers and the push rod for controlling the vertical louvers through a coupling transmission wherein the coupling transmission facilitates adjusting the vertical louvers only or the horizontal louvers only or both louvers simultaneously. A control of this type can also be designated as joy stick control.

It can be furthermore provided that the control device includes at least one electrical actuation drive through which an adjustment of the horizontal louvers and/or the vertical louvers is controllable.

An alternative embodiment of the ventilation device provides that one or plural vertical louvers and/or one or plural horizontal louvers are controllable opposite to each other with respect to a flow out direction. Thus, for example each second louver can be controlled opposite to an adjacent louver or each third louver or each fourth louver etc. which facilitates obtaining a diffuse outflow of the air flow.

In order to control the vertical and/or horizontal louvers that are oriented opposite to each other for forming a diffuse outflow one or plural push rods and one or plural link arrangements can be provided to perform the adjustment. Thus the link device can be manually actuatable or controlled by at least one electric drive. By the same token also a coupling transmission for joint control is feasible.

BRIEF DESCRIPTION OF THE DRAWINGS

The invention and additional advantageous embodiments and improvements thereof are subsequently described in more detail based on embodiments illustrated in the drawing figures. The features that can be derived from the description and the drawing figures can be used according to the invention individually or in any combination, wherein.

DETAILED DESCRIPTION OF THE INVENTION

Figure 2:
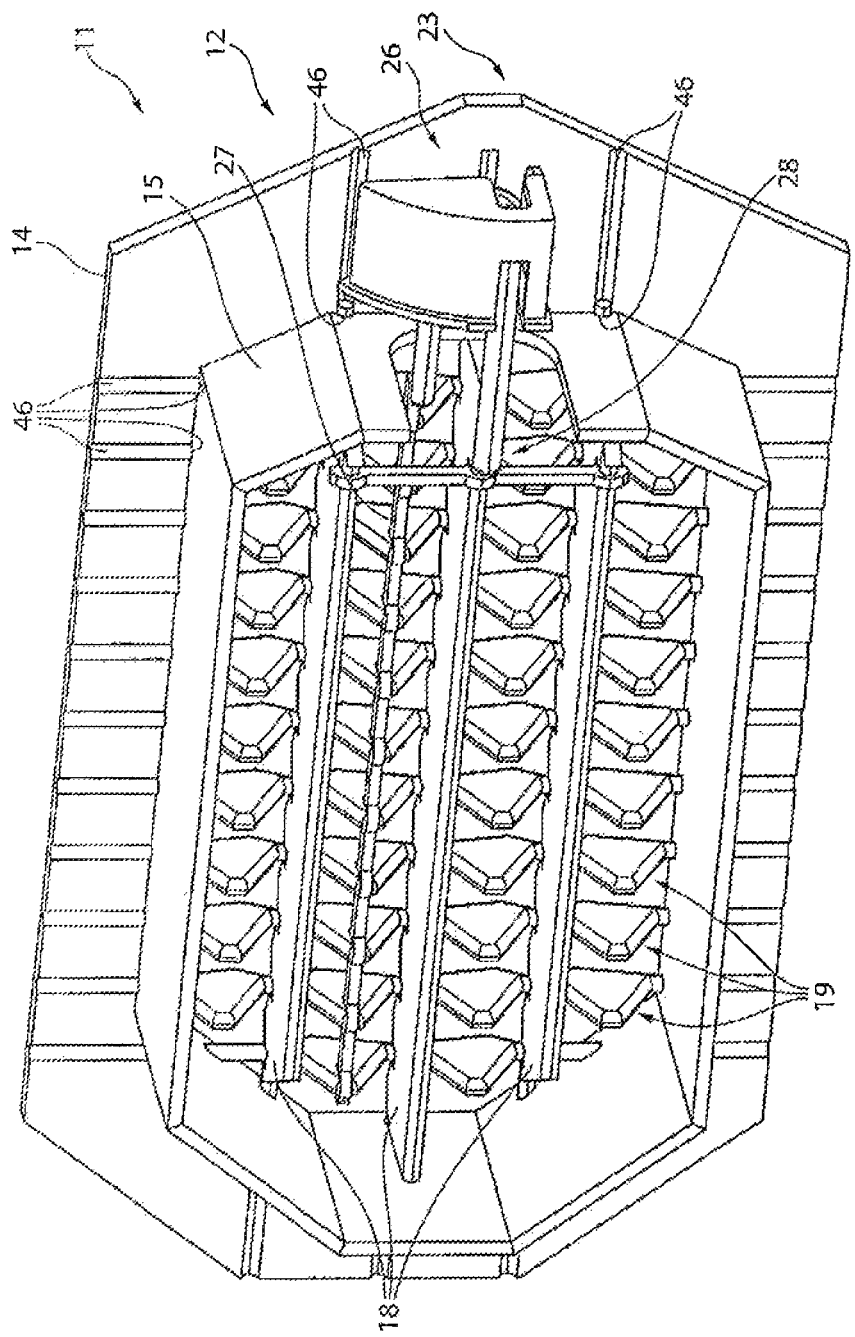
FIG. 2 illustrates a perspective rear view of the ventilation device according to FIG. 1.

FIG. 2 illustrates a perspective view of a ventilation device 11 which is attachable for example at an end of a ventilation channel for a ventilation or heating system at an instrument panel element of a motor vehicle. A ventilation device 11 of this type can also be used for other ventilation or heating systems.

The ventilation device 11 includes a housing 12 which includes at least one face frame 14 oriented towards a visible side and there behind a box or tube shaped housing section 15, as evident from FIG. 2. The frame 14 is advantageously mountable to the housing section 15.

This tube or box shaped housing section 15 is usable in a ventilation channel of the ventilation or heating system that is not illustrated in more detail. The ventilation device 11 is loaded with an air flow in a direction towards a back side of the ventilation device 11 according to FIG. 2 which provides an outflow direction from a front side of the ventilation device 11 according to FIG. 1.

In the embodiment the face frame 14 is also configured as a blind or an esthetic design element which can have many shapes.

In an outflow field 17 formed by the tubular housing section 15 a plurality of horizontal louvers 18 and vertical louvers 19 is arranged. The horizontal louvers 18 and vertical louvers 19 are advantageously oriented perpendicular to each other. The horizontal louvers 18 and the vertical louvers 19 are arranged on top of each other or nested into each other. This creates intersection points 21 between the horizontal louvers 18 and the vertical louvers 19. Advantageously these intersection points 21 are arranged in one plane.

A regulation device 23 is provided for controlling the horizontal louvers 18 and the vertical louvers 19 wherein the regulation device includes for example a single actuation element 24 which can be arranged at the visible side of the ventilation device. This single actuation element 24 is connected with a coupling transmission 26 which actuates a push rod 27. The push rod 27 is for example oriented horizontally and engages for example each vertical louver 19. Furthermore the coupling transmission 26 is connected with a link arrangement 28 which is linked to the horizontal louvers 18 so that these are controlled to pivot about the horizontal pivot axis 32.

The actuation element 24 is for example integrated into the face frame 14. Alternatively the actuation element 24 can also be arranged outside of the face frame 14.

The regulation device 23 facilitates that the horizontal louvers 18 and the vertical louvers 19 are respectively controllable independently from each other. Thus a simultaneous pivot movement of the horizontal louver 18 and the vertical louver 19 is controllable.

Figure 3:
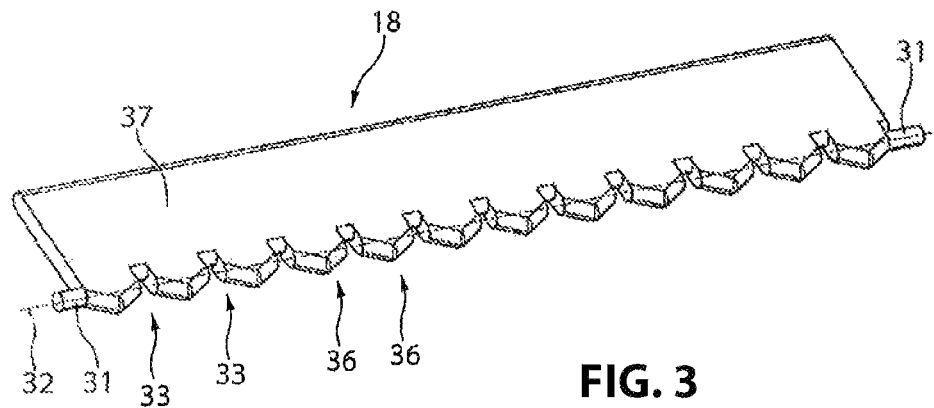
FIG. 3 illustrates a perspective view of a horizontal louver.

FIG. 3 illustrates an exemplary perspective view of the horizontal louvers 18, The horizontal louver 18 includes a bearing pinion 31 at a face end of the horizontal louver so that the horizontal louver 18 is supported about a pivot axis 32 extending through the bearing pin 31. The horizontal louvers 18 furthermore includes groove shaped recesses 33 penetrating the pivot axis 32 wherein the groove shaped recesses 33 form a portion of a bearing 44 with the vertical louver 19. Between the groove shaped recesses 33 a protrusion 36 can be formed in the flow out direction. The geometry and shape of these protrusions 36 can be adapted to the optics in order to form an attractive and/or homogeneous visual appearance in the outflow field 17. A guide surface 37 is configured adjacent to the groove shaped recesses 33 and opposite to the outflow direction wherein the guide surface advantageously extends continuously over the length of the horizontal louvers 18. Thus, a deflection of the air flow in upward or downward direction can be provided.

Figures 4, 6:
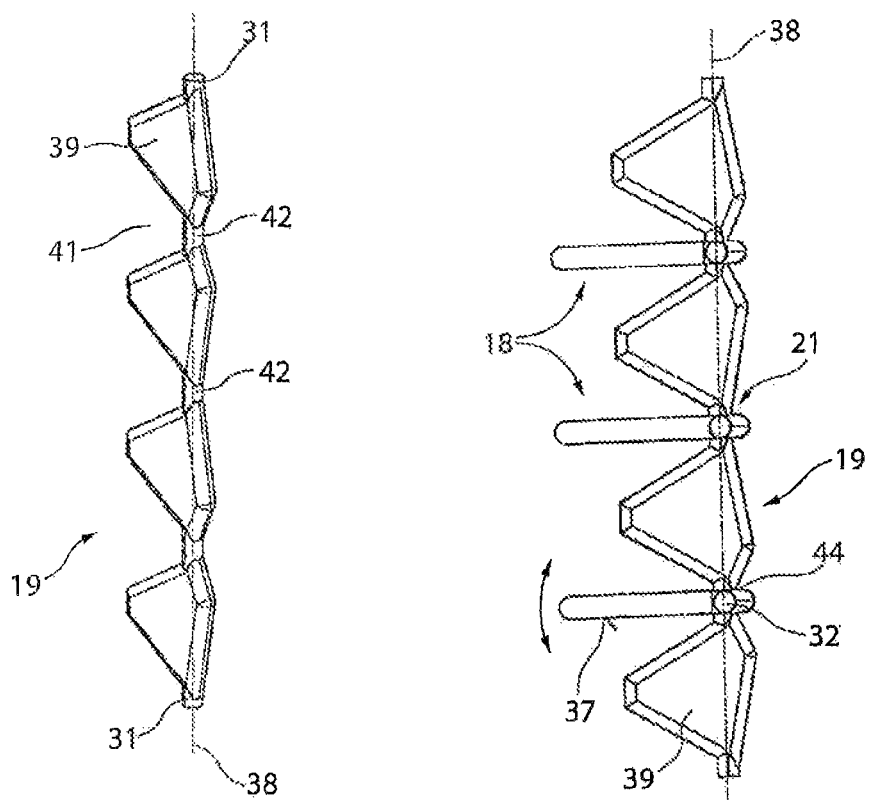
FIG. 4 illustrates a perspective view of a vertical louver.
FIG. 6 illustrates a schematic side view of the arrangement according to FIG. 5.

FIG. 4 illustrates a perspective view of the vertical louver 19. The vertical louver 19 also includes a bearing pinion 31 at a respective face end. Thus, the vertical louver 19 is arranged to be pivot able about a pivot axis 38 in the housing 12. The vertical louver 19 includes angle shaped or triangular guide surfaces 39 so that V-shaped recesses 41 are provided between the serially arranged pennant shaped guide surfaces 39. These recesses 41 form a free space for pivot ability of the horizontal louver 18 as evident from FIG. 6. Axle sections 42 are formed between the pennant shaped guide surfaces 39. A face of the pennant shaped guide surfaces 39 that is pointed in the outflow direction can be adapted with respect to geometry and shape to a desired visual appearance of the flow out field 17.

Figure 5:
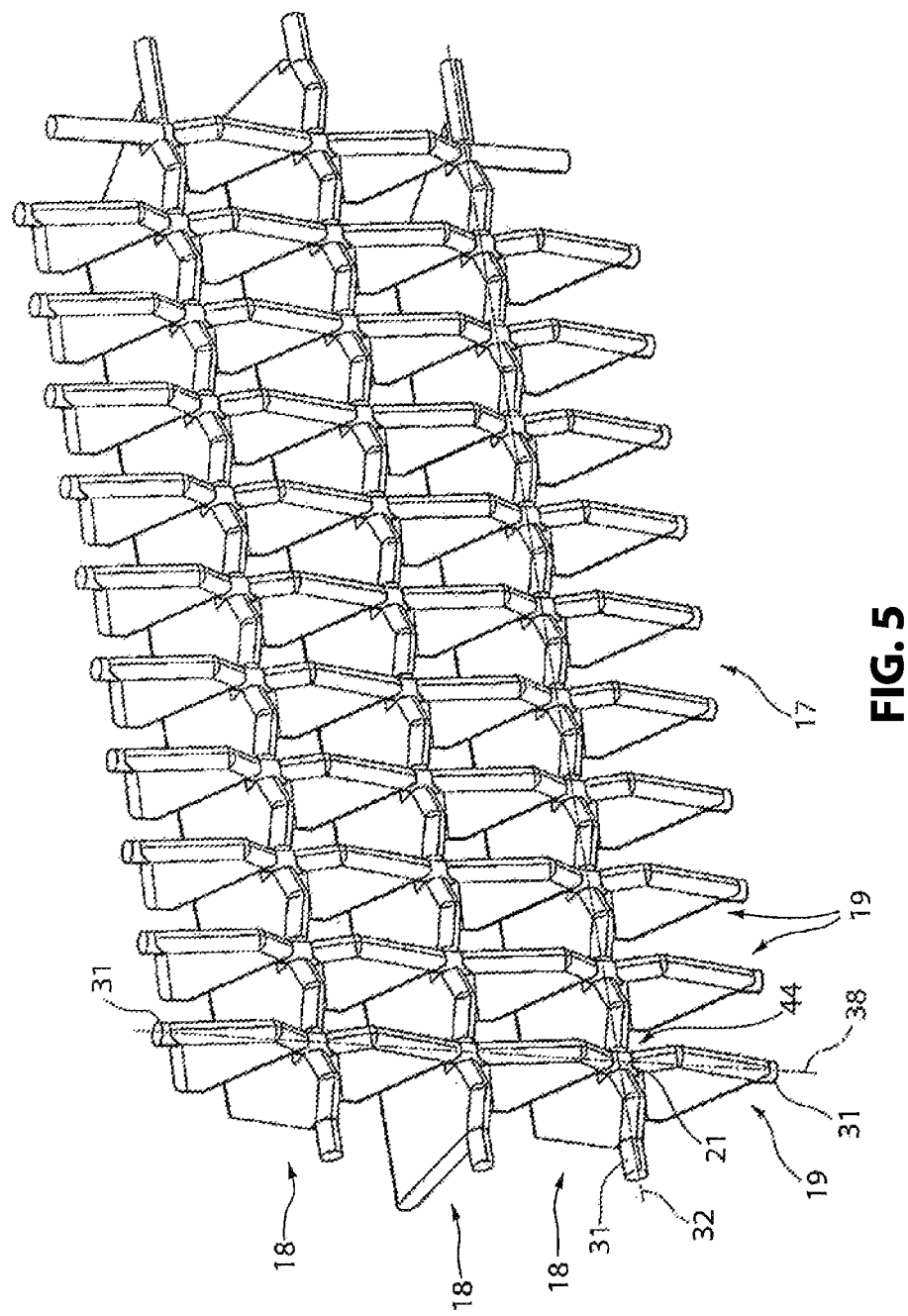
FIG. 5 illustrates a perspective view of plural horizontal and vertical louvers that are arranged on top of each other.

FIG. 5 illustrates a schematic view where the horizontal louvers 18 and the vertical louvers 19 are placed into each other. Thus, the groove shaped recesses 33 of the horizontal louver 18 receive the axle sections 42 of the vertical louver 19 and form a bearing 44 in the intersection point 21 wherein the bearing associates and fixates the horizontal louver 18 and the vertical louver 19 relative to each other, wherein a pivot ability of the horizontal louver 18 about the pivot axis 32 and of the vertical louver 19 about the pivot axis 38 is maintained. The pivot axes 32 of the horizontal louvers 18 and the pivot axes 38 of and the vertical louvers 19 intersect wherein the intersection points 21 are advantageously all arranged in a common plane.

Through this nesting of the horizontal louver 18 and the vertical louver 19 it is evident according to FIG. 5 that the vertical louver 19 is pivotable about the pivot axis 38 regardless of an orientation of the horizontal louver 18.

FIG. 6 shows a side view of FIG. 5. This emphasizes that the pivotability of the horizontal louver 18 is facilitated by the shaped recess 41 or through the pennant shaped configuration of the guide surface 39 of the vertical louver 19. The bearing 44 formed in the intersection point 21 thus facilitates a pivot movement of the vertical louver 19 about its pivot axis 38 as well as a pivot movement of the horizontal louver 18 about its pivot axis 32.

The face frame 14 and the tubular housing section 15 can include bearing receivers 46 at respective faces that are oriented towards each other so that a simple assembly is provided after positioning the horizontal louvers 18 on the housing section 15 and subsequent arrangement of the vertical louvers 19 by fixating the frame 14 relative to the housing section 15.

Figure 1:
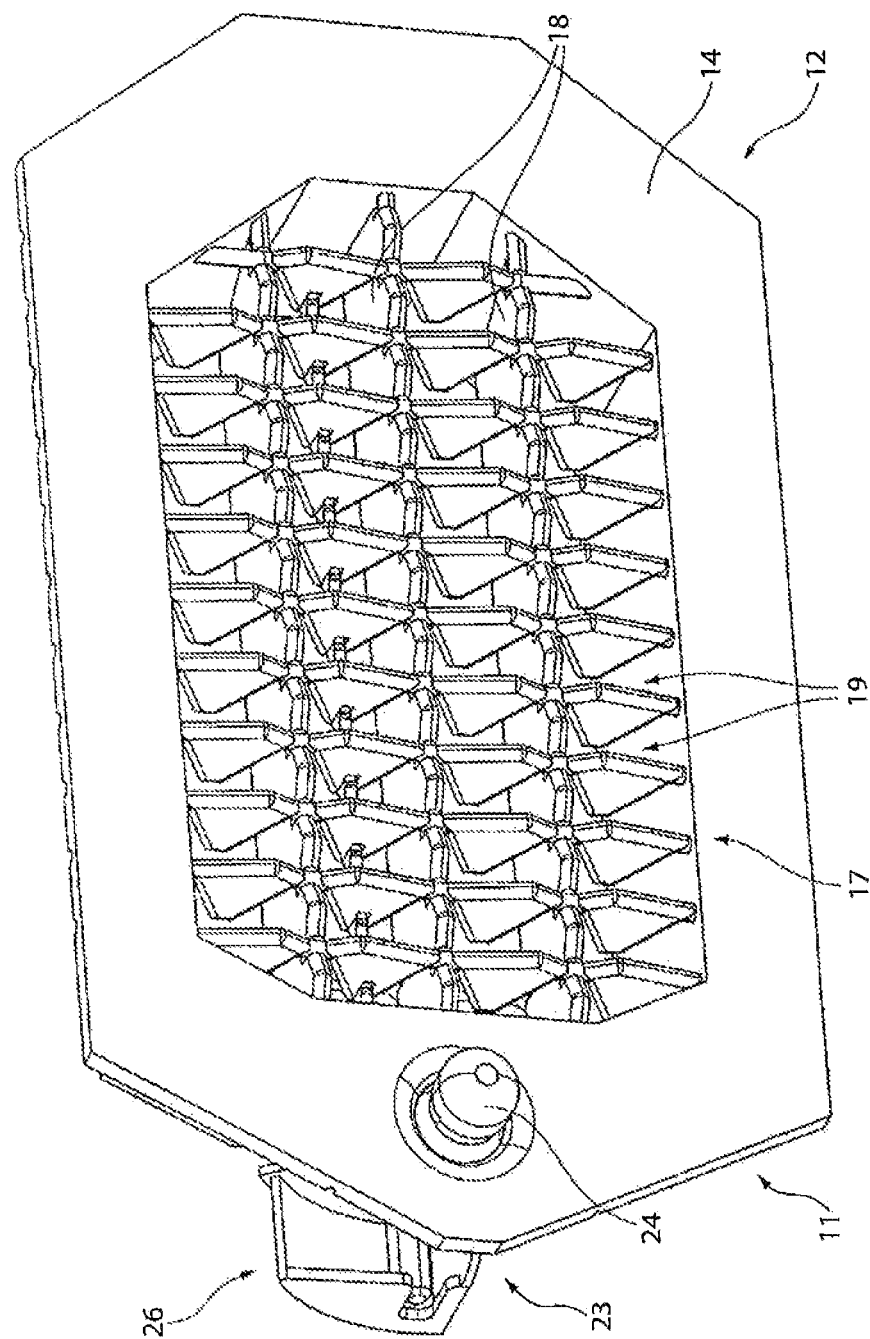
FIG. 1 illustrates a perspective front view of the ventilation device according to the invention.
Figure 7:
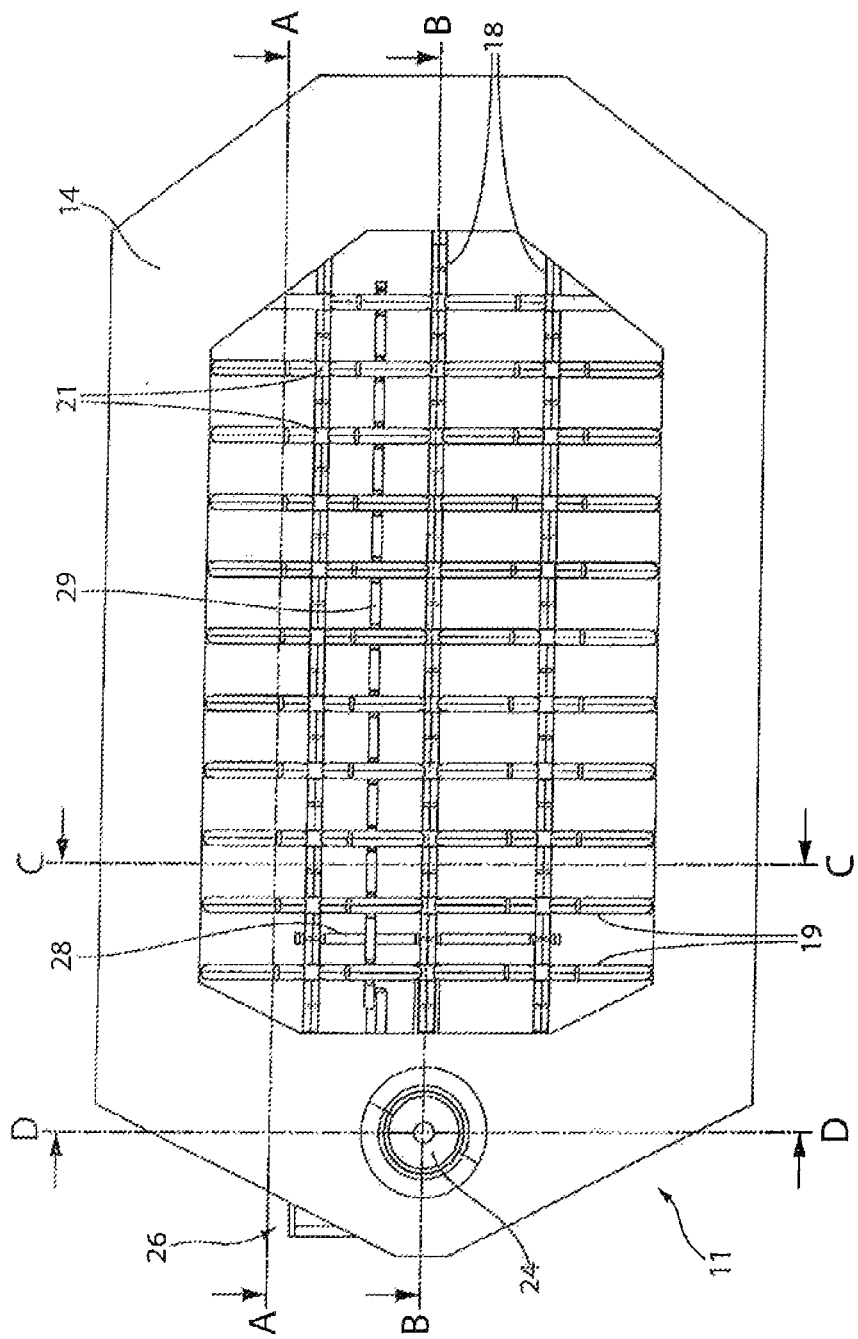
FIG. 7 illustrates a schematic front view of the ventilation device according to FIG. 1.

FIG. 7 illustrates a schematic front view of the ventilation device 11 according to FIG. 1. Thus, the homogenous visual appearance of the horizontal louvers 18 and the vertical louvers 19 becomes apparent.

What is claimed is:

1. A ventilation device, comprising:
a housing including at least two horizontal louvers and at least two vertical louvers that are connected so as to intersect in a nested fashion, and a face frame that is arranged on a flow out side of the housing; and
a regulation device which controls at least one flow out direction,
wherein the regulation device includes a single actuation element configured to adjust the at least two horizontal louvers and the at least two vertical louvers
wherein the single actuation element is arranged on a flow out side of the housing,
wherein the at least two horizontal louvers and the at least two vertical louvers are respectively supported in the housing so that the at least two vertical louvers are pivotable about at least two respective vertical pivot axes and the at least two horizontal louvers are pivotable about at least two respective horizontal pivot axes,
wherein the ventilation device includes a coupling transmission,
wherein the coupling transmission actuates a horizontal pushrod directly which engages each vertical louver of the at least two vertical louvers directly on a side near an edge that is oriented against the at least one flow out direction,
wherein the horizontal pushrod extends parallel to the horizontal pivot axis,
wherein the coupling transmission is connected with a link arrangement,
wherein the link arrangement is pivotably linked at each horizontal louver of the at least two horizontal louvers and configured to pivot each horizontal louver of the at least two horizontal louvers,
wherein the single actuation element is directly connected with the coupling transmission, and
wherein the single actuation element is integrated into the face frame or arranged outside of the face frame,
wherein the at least two horizontal louvers and the at least two vertical louvers intersect at intersection points,
wherein the at least two horizontal louvers and the at least two vertical louvers are free from each other in the intersection points, or
wherein bearings connecting the at least two horizontal louvers and the at least two vertical louvers are formed in the intersection points so that the at least two horizontal louvers are pivotable about the at least two respective horizontal pivot axes in the bearings and the at least two vertical louvers are pivotable about the at least two respective vertical pivot axes in the bearings,
wherein the intersection points are formed by groove shaped recesses in the at least two horizontal louvers or in the at least two vertical louvers, and
wherein an axle section of the at least two vertical louvers or of the at least two horizontal louvers is received in the groove shaped recesses.

2. The ventilation device according to claim 1, wherein the at least two vertical louvers or the at least two horizontal louvers include V-shaped recesses which extend starting from intersection points of the at least two vertical louvers and the at least two horizontal louvers against the at least one flow out direction and which expands against the at least one flow out direction.

3. The ventilation device according to claim 1,
wherein the at least two horizontal louvers include triangular or pennant shaped guide surfaces that are oriented along the at least two respective horizontal pivot axes of the at least two horizontal louvers and that expand in the at least one flow out direction towards the at least two respective horizontal pivot axes of the at least two horizontal louvers, or
wherein the at least two vertical louvers include triangular or pennant shaped guide surfaces surface oriented along the at least two respective vertical pivot axes of the at least two vertical louvers and that expand in the at least one flow out direction towards the at least two respective vertical pivot axes of the at least two vertical louvers.

4. The ventilation device according to claim 1,
wherein the at least two vertical louvers or the at least two horizontal louvers include continuous guide surfaces arranged along the at least two respective vertical pivot axes or the at least two respective horizontal pivot axes and adjacent to intersection points of the at least two vertical louvers and the at least two horizontal louvers wherein the continuous guide surfaces extend against the at least one flow out direction.

5. The ventilation device according to claim 1, wherein the at least two respective horizontal pivot axes of the at least two horizontal louvers and the at least two respective vertical pivot axes of the at least two vertical louvers intersect respectively and form intersection points.

6. The ventilation device according to claim 1, wherein the at least two respective horizontal pivot axes and the at least two respective vertical pivot axes are arranged in a common plane.

7. The ventilation device according to claim 1,
wherein the regulation device has at least one electrical drive which controls the push rod and the link arrangement individually or jointly.

8. The ventilation device according to claim 1, wherein the wherein the link arrangement engages each horizontal louver of the at least two horizontal louvers on a side of each horizontal louver near an edge that is oriented against the at least one flow out direction.

* * * * *